(12) United States Patent
Herrera Gutierrez et al.

(10) Patent No.: US 11,964,547 B2
(45) Date of Patent: Apr. 23, 2024

(54) ARRANGEMENT CONFIGURED TO OPPOSE MOVEMENT OF VEHICLE DOOR

(71) Applicant: Ford Global Technologies, LLC, Dearborn, MI (US)

(72) Inventors: Michelle Carolina Herrera Gutierrez, Mexico City (MX); Luis Enrique Castillo Jaime, Distrito Federal (MX); Antonio Dario Garay Serrano, Toluca (MX); Alejandro Sánchez Islas, Moctezuma Segunda Sección (MX); Zhibing Deng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 17/459,072

(22) Filed: Aug. 27, 2021

(65) Prior Publication Data
US 2023/0066207 A1 Mar. 2, 2023

(51) Int. Cl.
*B60J 5/06* (2006.01)
*E05D 15/06* (2006.01)
*E05D 15/10* (2006.01)

(52) U.S. Cl.
CPC ............ *B60J 5/06* (2013.01); *E05D 15/0621* (2013.01); *E05D 15/1081* (2013.01); *E05D 2015/1086* (2013.01); *E05Y 2600/312* (2013.01); *E05Y 2900/531* (2013.01)

(58) Field of Classification Search
CPC ....... B60J 5/06; B60J 5/0479; E05D 15/0621; E05D 15/1081; E05D 2015/1086; E05D 15/1047; E05D 2015/1026; E05Y 2600/312; E05Y 2900/531; E05Y 2201/246; E05Y 2201/22; E05Y 2201/42; E05Y 2201/64; E05B 83/40; E05B 83/38
USPC ......................................................... 296/155
See application file for complete search history.

(56) References Cited

U.S. PATENT DOCUMENTS

| 4,433,507 A * | 2/1984 | Chikaraishi | E05F 7/04 49/213 |
| 4,561,690 A * | 12/1985 | Shinjo | B60J 5/0409 292/336 |
| 4,842,313 A * | 6/1989 | Boyko | E05B 81/22 292/341.16 |
| 5,626,384 A * | 5/1997 | Walther | E05F 7/04 296/146.1 |

(Continued)

FOREIGN PATENT DOCUMENTS

| JP | 4823658 B2 | 11/2011 |
| JP | 2013082306 A | 5/2013 |
| JP | 5696883 B2 | 4/2015 |

*Primary Examiner* — Amy R Weisberg
*Assistant Examiner* — Sara Laghlam
(74) *Attorney, Agent, or Firm* — Vichit Chea; Carlson, Gaskey & Olds, P.C.

(57) ABSTRACT

This disclosure relates to a motor vehicle with an arrangement configured to oppose movement of a vehicle door, and a corresponding method. An example motor vehicle includes a body, a door configured to slide relative to the body between an open position and a closed position, and a bracket connected to the door. The bracket includes a slot. Further, a locking arm is mounted to the body, and, when the door is in the closed position, the locking arm is configured to move such that the locking arm is received in the slot.

18 Claims, 4 Drawing Sheets

(56) References Cited

U.S. PATENT DOCUMENTS

| | | | |
|---|---|---|---|
| 6,305,737 B1 * | 10/2001 | Corder | E05F 15/63 296/146.12 |
| 6,926,342 B2 * | 8/2005 | Pommeret | E05D 15/1081 296/146.12 |
| 9,068,383 B2 * | 6/2015 | Wurst | E05D 3/18 |
| 10,000,947 B2 * | 6/2018 | Alarcon Hernandez | B60J 5/06 |
| 10,384,519 B1 * | 8/2019 | Brown | B60J 5/047 |
| 10,876,341 B2 * | 12/2020 | Taylor | E05F 15/41 |

* cited by examiner

ARRANGEMENT CONFIGURED TO OPPOSE MOVEMENT OF VEHICLE DOOR

TECHNICAL FIELD

This disclosure relates to a motor vehicle with an arrangement configured to oppose movement of a vehicle door, and a corresponding method.

BACKGROUND

Motor vehicles include doors used for entering and exiting the vehicle. Some vehicles include two doors per side, with each door configured to selectively cover and uncover a respective opening. Most vehicles include a vertical support, namely a B-pillar, separating the door openings. However, in some examples, there is no vertical support separating the openings, and thus the doors are configured to open and close to cover respective portions of a larger opening.

SUMMARY

A motor vehicle according to an exemplary aspect of the present disclosure includes, among other things, a body, a door configured to slide relative to the body between an open position and a closed position, and a bracket connected to the door. The bracket includes a slot. Further, a locking arm is mounted to the body, and, when the door is in the closed position, the locking arm is configured to move such that the locking arm is received in the slot.

In a further non-limiting embodiment of the foregoing motor vehicle, the motor vehicle includes a linkage assembly including a plurality of links mounted to the bracket. When the door is in the closed position, the linkage assembly is configured such that at least one of the plurality of links contacts the body.

In a further non-limiting embodiment of any of the foregoing motor vehicles, the body includes a rocker panel adjacent a bottom of a door opening, the rocker panel includes an upper portion and a lower portion having an elongate opening between the upper portion and the lower portion, the locking arm is mounted to the lower portion of the rocker panel, and, when the door is in the closed position, the linkage assembly is configured such that at least one of the plurality of links contacts the upper portion.

In a further non-limiting embodiment of any of the foregoing motor vehicles, the bracket projects through the elongate opening.

In a further non-limiting embodiment of any of the foregoing motor vehicles, as the door moves to the closed position, one of the plurality of links is configured to slide along the bracket to raise another of the plurality of links into contact with the body.

In a further non-limiting embodiment of any of the foregoing motor vehicles, the plurality of links includes at least one link configured to move vertically as another of the plurality of links slides without moving vertically.

In a further non-limiting embodiment of any of the foregoing motor vehicles, the plurality of links includes a first link, a second link, a third link, and a fourth link, a first end of the first link is rotatably mounted to the bracket, a second end of the first link is rotatably mounted to a first end the second link, a second end of the second link is rotatably mounted to a first end of the third link, a second end of the third link is rotatably mounted to a first end of the fourth link, the fourth link includes a pin adjacent a second end of the fourth link, and the pin is configured such that as the door moves to the closed position, the pin contacts the body so as to cause the fourth link to slide relative to the bracket and to raise the second link into contact with the body.

In a further non-limiting embodiment of any of the foregoing motor vehicles, the locking arm is moveable by an actuator.

In a further non-limiting embodiment of any of the foregoing motor vehicles, the actuator includes a pinion and a rack, and movement of the rack is configured to rotate the locking arm.

In a further non-limiting embodiment of any of the foregoing motor vehicles, the locking arm includes a shaft and a head having a greater dimension than the shaft, and, when the door is in the closed position, the locking arm is configured to move such that the shaft of the locking arm is received in the slot and the head is on an opposite side of the bracket as the actuator.

In a further non-limiting embodiment of any of the foregoing motor vehicles, the head includes a flat surface on an opposite side of the head as the slot.

In a further non-limiting embodiment of any of the foregoing motor vehicles, the door is a rear door on a first side of the motor vehicle, the motor vehicle includes a front door on the first side, the front and rear doors are configured to open and close relative to front and rear portions of a door opening, and the door opening is not separated by a vertical support of the motor vehicle.

In a further non-limiting embodiment of any of the foregoing motor vehicles, the bracket includes rollers configured to permit the door to slide relative to the body.

A method according to an exemplary aspect of the present disclosure includes, among other things, rotating a locking arm into a slot of a bracket. The locking arm is mounted to a body of a motor vehicle. Further, the bracket is connected to a door configured to slide relative to the body between an open position and a closed position.

In a further non-limiting embodiment of the foregoing method, the method includes moving a link of a linkage assembly into contact with the body, where the linkage assembly is mounted to the bracket.

In a further non-limiting embodiment of any of the foregoing methods, the moving step includes sliding one of the links of the linkage assembly to cause another of the links of the linkage assembly to raise into contact with the body.

In a further non-limiting embodiment of any of the foregoing methods, the locking arm is mounted to a lower rocker sill, and the moving step includes moving the link into contact with an upper rocker sill.

In a further non-limiting embodiment of any of the foregoing methods, the bracket projects through an elongate opening between the upper and lower rocker sills.

In a further non-limiting embodiment of any of the foregoing methods, the locking arm is moveable by an actuator.

In a further non-limiting embodiment of any of the foregoing methods, the locking arm includes a shaft and a head having a greater dimension than the shaft, and the rotating step includes rotating the locking arm such that the shaft of the locking arm is received in the slot and the head is on an opposite side of the bracket as the actuator.

BRIEF DESCRIPTION OF THE DRAWINGS

In FIG. 1, the doors of the motor vehicle are closed.

In FIG. 4, a locking arm is received in a slot of the bracket. Further, in FIG. 4, a passively moveable mechanism is in a position such that it contacts an upper rocker sill.

DETAILED DESCRIPTION

This disclosure relates to a motor vehicle with an arrangement configured to oppose movement of a vehicle door, and a corresponding method. An example motor vehicle includes a body, a door configured to slide relative to the body between an open position and a closed position, and a bracket connected to the door. The bracket includes a slot. Further, a locking arm is mounted to the body, and, when the door is in the closed position, the locking arm is configured to move such that the locking arm is received in the slot. The disclosed arrangement opposes movement of the bracket, and in turn the door, in response to forces applied to the door. The disclosed arrangement is particularly useful in vehicles without a B-pillar as the disclosed arrangement provides some or all of the stability that would normally be provided by a B-pillar. These and other benefits will be appreciated from the below description.

Figure 1:
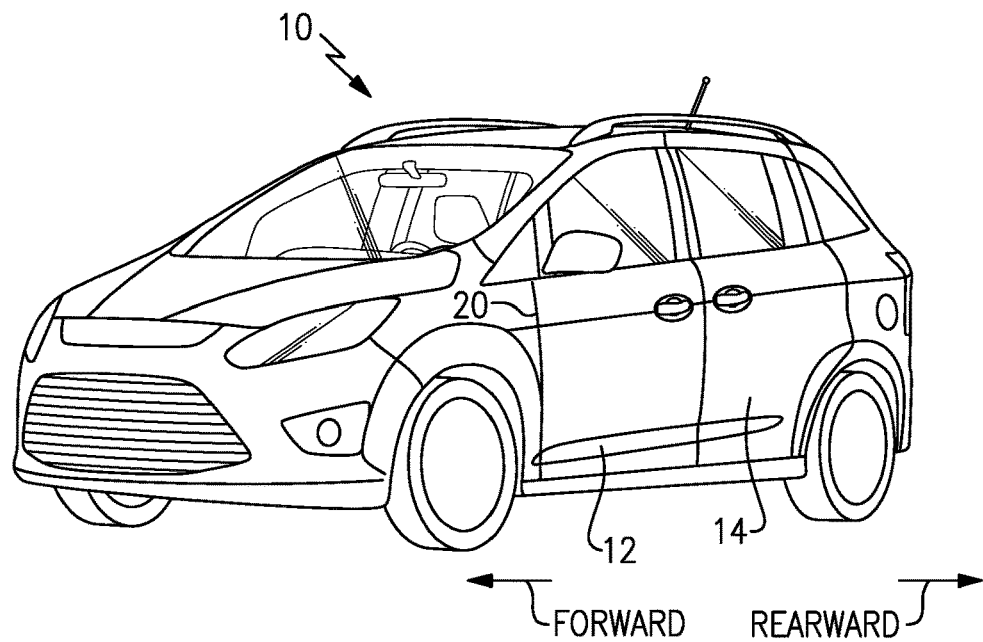
FIG. 1 is a side view of an example motor vehicle.

Turning to the drawings, FIG. 1 is a side perspective view of a motor vehicle 10 ("vehicle 10"). The side of the vehicle 10 shown in FIG. 1 is a driver side in regions such as North America. The side includes a first door 12, which is a front door, and a second door 14, which is a rear door and which is rearward of the first door 12 (the "forward" and "rearward" directions are labeled in some drawings for ease of reference). While only one side of the vehicle 10 is shown in FIG. 1, it should be understood that the opposite side of the vehicle 10 can include a similar door arrangement.

Figure 2:
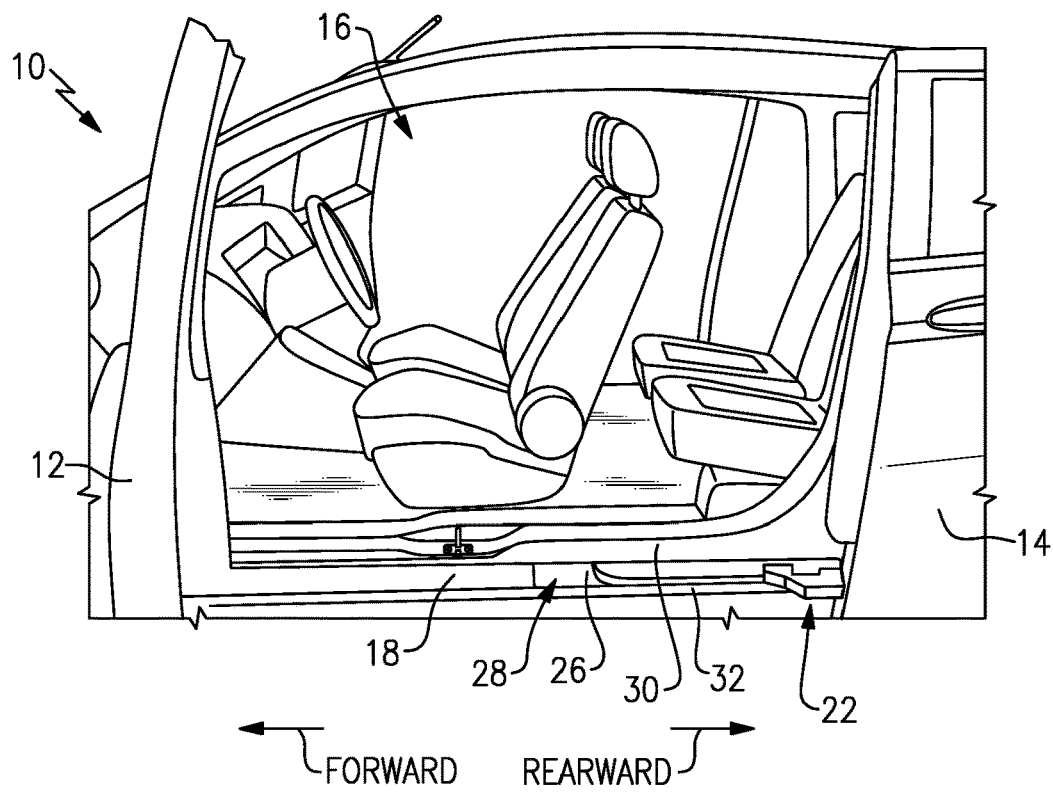
FIG. 2 is a side view of a portion of the motor vehicle with the doors open.

The first and second doors 12, 14 are configured to open and close relative an opening 16 (FIG. 2). The vehicle 10 does not include a vertical support, such as a B-pillar, separating the opening 16. Thus, the opening 16 spans from a location adjacent a front edge of the first door 12 to a location adjacent a rear edge of the second door 14. The opening 16 is defined in a side of a body 18 of the vehicle 10. The body 18 of the vehicle 10 includes the various supporting structures of the vehicle 10 such as the frame, pillars, and body panels.

The first door 12, in this example, is configured to open and close about a hinged connection adjacent a front edge 20 of the first door 12. When closed, the first door 12 covers a forward portion of the opening 16. The second door 14, in this example, is configured to slide relative to the remainder of the body 18 to open and close relative to a rearward portion of the opening 16.

In part, the second door 14 is connected to the body 18 of the vehicle 10 via bracket 22, which projects from the second door 14 through an opening 26 in the body 18, in this example. The opening 26 is elongate and exhibits a length parallel to a centerline of the vehicle 10 provided in a rocker panel 28 of the body 18. The rocker panel 28 is adjacent a bottom of the opening 16. Specifically, the opening 26, in this example, is provided between an upper and lower portion of the rocker panel 28, namely an upper rocker sill 30 and a lower rocker sill 32.

Figure 3:
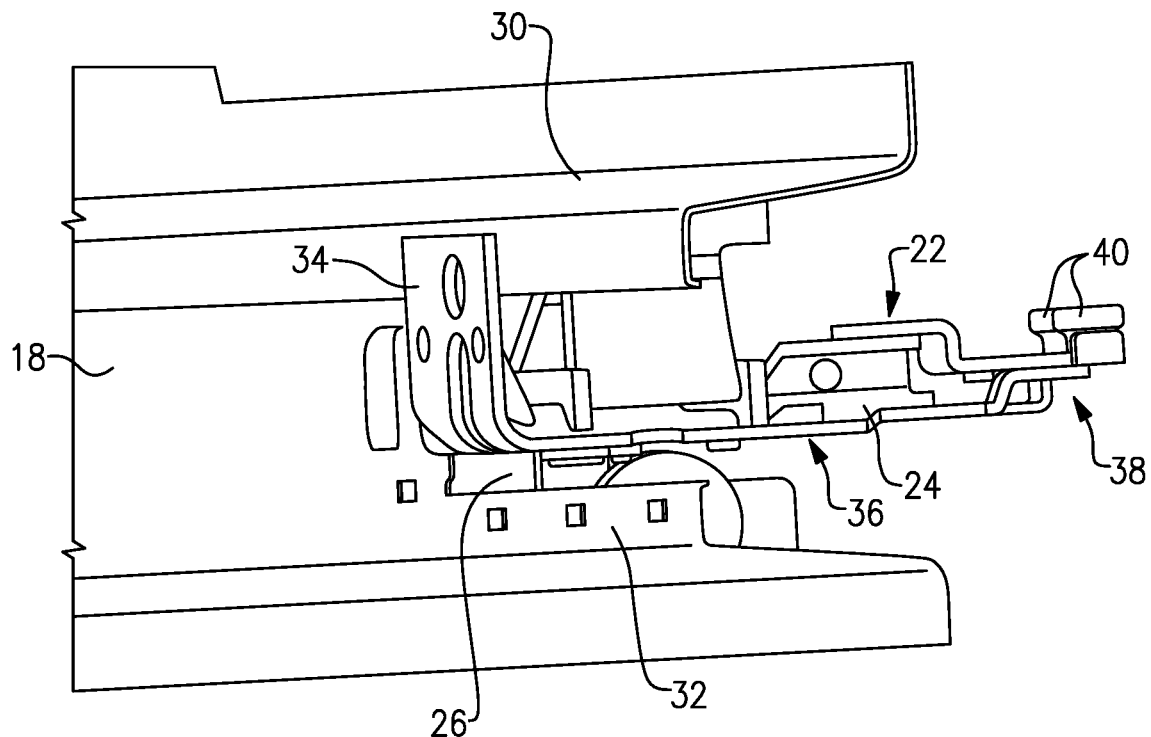
FIG. 3 is a view of an exemplary arrangement, including a bracket configured to connect to a sliding door of the vehicle, from an exterior perspective.

With reference to FIG. 3, which illustrates the bracket 22 detached from the second door 14, the bracket 22 includes a first portion 34 on an exterior of the body 18 configured to connect to the second door 14 either directly or indirectly using fasteners or by welding, as examples. The first portion 34 extends vertically upward, in direction normal to a ground surface, from a main body 36 of the bracket 22. The main body 36 extends from the first portion 34, through the opening 26, to a second portion 38 including plurality of rollers 40 configured to slide in a track, either manually or using one or more actuators, to guide movement of the second door 14 between the open and closed position.

Because the vehicle 10 lacks a B-pillar separating the opening 16, which would ordinarily stabilize the bracket 22, the bracket 22 is stabilized using other features. One feature includes an actively moveable mechanism, which includes a locking arm. Another feature is a passively moveable mechanism. This disclosure extends to arrangements including one or both of the actively and passively moveable mechanisms.

Figure 4:
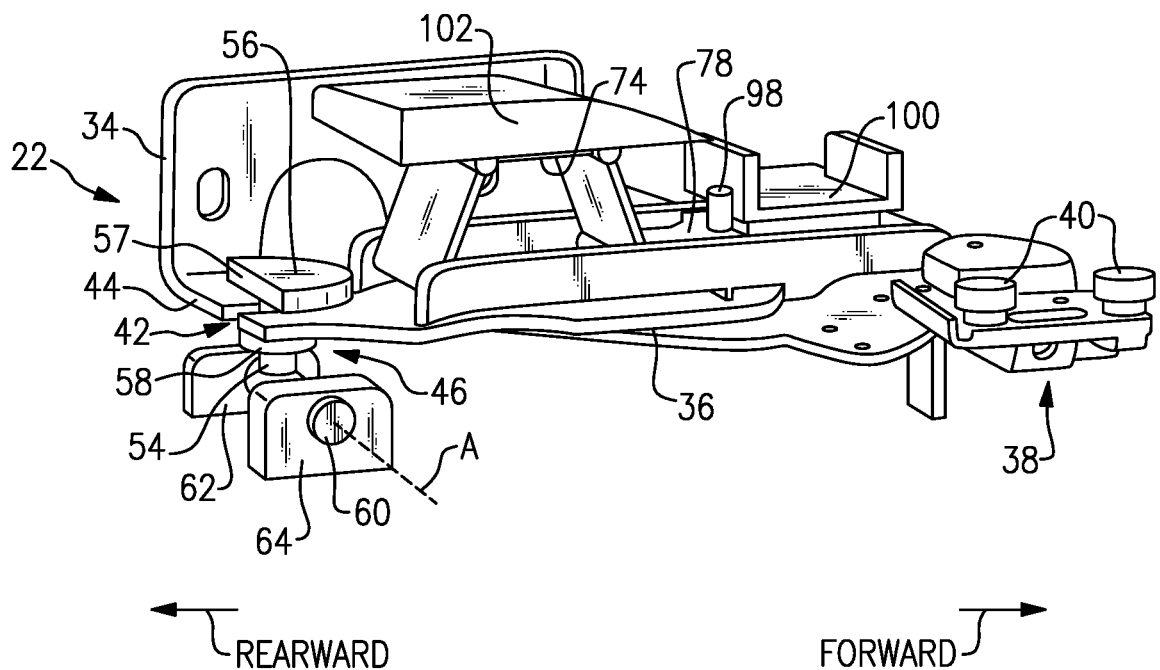
FIG. 4 is a view of the arrangement from an interior perspective.
Figure 5:
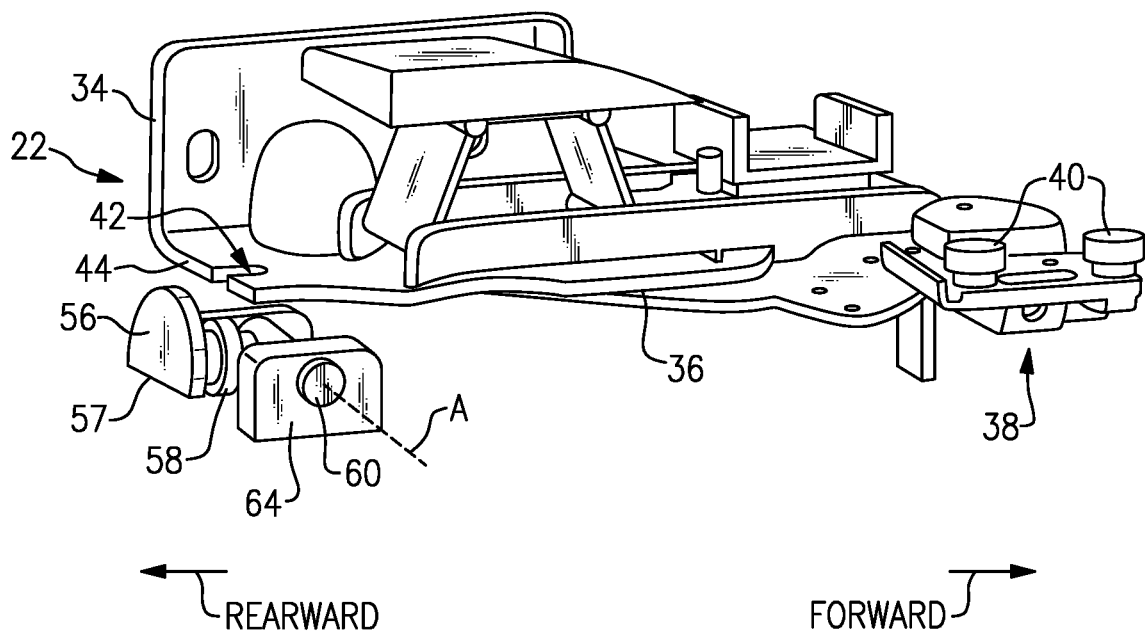
FIG. 5 is a view of the arrangement from an interior perspective and illustrates the locking arm rotated relative to its position of FIG. 4 such that the locking arm is not received in the slot of the bracket.

The actively moveable mechanism is perhaps best seen in FIGS. 4 and 5, which illustrate the bracket 22 and adjacent structures from an interior perspective. As shown, the main body 36 of the bracket 22 includes a slot 42 in a rear-most edge 44 of the bracket 22. The slot 42 extends forwardly from the rear-most edge 44. The slot 42 is dimensioned to correspond to a locking arm 46, which mounted to the body 18, namely the lower rocker sill 32, and is selectively moveable such that when the second door 14 is in the closed position, the locking arm 46 is configured to be received in the slot 42.

Figure 6:
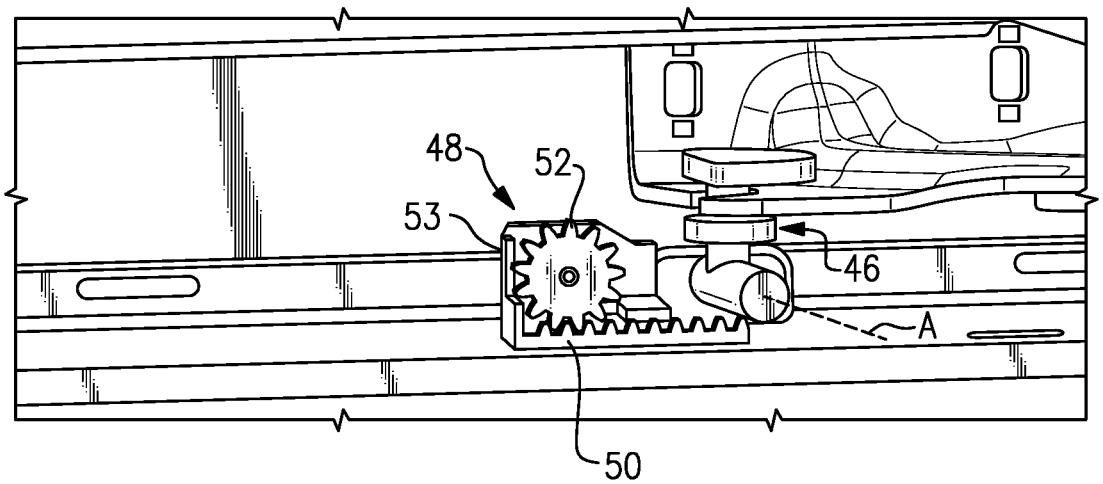
FIG. 6 is another view of the arrangement from an interior perspective and in particular illustrates an example actuator assembly configured to rotate the locking arm.

The locking arm 46 is rotatable about an axis A through a range of about 90° between the positions of FIG. 4 and FIG. 5. The axis A is perpendicular to a centerline of the vehicle 10. The locking arm 46 is moveable by an actuator assembly 48 (FIG. 6), which in an example includes a rack 50 and a pinion 52. The pinion 52 is configured to rotate in response to a motor 53 or other actuator to drive the rack 50, which in turn rotates the locking arm 46 about the axis A. The motor 53 may be responsive to instructions from a controller of the vehicle 10 and/or may be programmed to move the locking arm 46 into the slot 42 each time the second door 14 is closed and locked. The motor 53 may also be programmed to rotate the locking arm 46 out of the slot 42 to the position of FIG. 5 each time the second door 14 is unlocked, each time a user attempts to open the door by applying a force to a handle or pressing a button, and/or each time the vehicle 10 is put into park after driving, as examples.

With reference to FIG. 4, the locking arm 46 includes a central shaft 54 extending perpendicular to the axis A. The slot 42 is dimensioned to correspond to the diameter of the central shaft 54. The locking arm 46 further includes a head 56 at an end of the central shaft 54 opposite the axis A. The locking arm 46 further includes a collar 58 along the central shaft 54 between the head 56 and the axis A. As shown in FIG. 4, when the central shaft 54 of the locking arm 46 is received in the slot 42, the head 56 is vertically above the bracket 22, on an opposite side of the actuator assembly 48, and the collar 58 is vertically below the bracket 22.

On an opposite side as the slot 42, the head 56 exhibits a flat, or flat surface, 57 extending in a direction perpendicular to a centerline of the vehicle 10. The flat 57 is configured such that when the locking arm 46 is in the position of FIG. 5, the flat 57 rests flat against the lower rocker sill 32. With the flat 57, the head 56 to sits lower relative to the bracket 22 than if the flat 57 were not present. The flat 57 permits the bracket 22 to pass above the head 56 without the head 56 interfering with movement of the bracket 22.

The locking arm 46, in this example, projects from a pin 60. The pin 60 extends along the axis A and is rotatably connected to the body 18 via brackets 62, 64. The pin 60 is operably connected to the rack 50 such that linear movement of the rack 50 results in rotation of the pin 60 about the axis A, and in turn results in rotation of the locking arm 46. The brackets 62, 64 may be attached to or integrally formed with the lower rocker sill 32.

When the locking arm 46 is received in the slot 42, the locking arm 46 contacts the bracket 22 so as to oppose movement of the bracket 22 relative to the body 18, which may be brought about by forces applied to a side of the vehicle 10 via contact with the second door 14. In particular, contact between the head 56 and the upper surface of the bracket 22 opposes upward movement of the bracket 22 due to the locking arm 46 being connected to the lower rocker sill 32.

Figure 7:
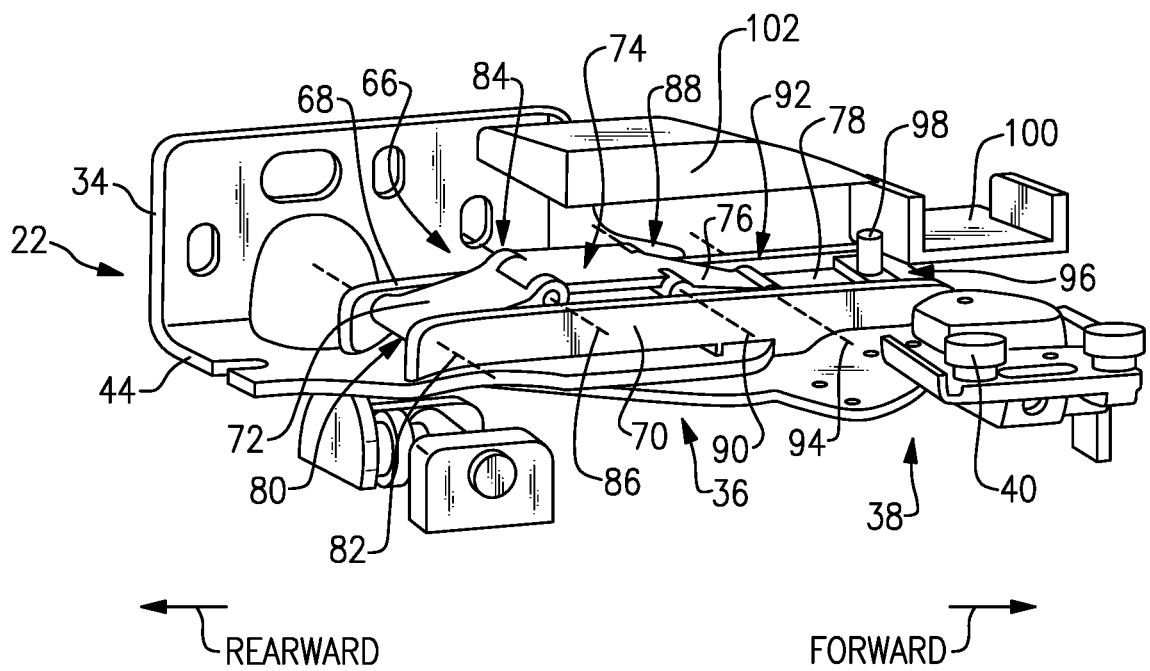
FIG. 7 is another view of the arrangement from an interior perspective and in particular illustrates the passively moveable mechanism in a position in which the passively moveable mechanism does not contact the upper rocker sill.

The passively moveable mechanism is configured to engage, indirectly in this example, the upper rocker sill 30. With reference to FIG. 7, the passively moveable mechanism includes, in this example, a linkage assembly 66 mounted to a top of the bracket 22, as shown in FIG. 2. In this example, the linkage assembly 66 is laterally constrained between opposed side rails 68, 70, which are spaced-apart from one another in a direction perpendicular to the centerline of the vehicle 10 and which exhibit a length dimension in a direction parallel to the centerline of the vehicle 10. The side rails 68, 70 project upwardly from an upper surface of the bracket 22.

The linkage assembly 66 includes a plurality of links. Here, the linkage assembly includes four links, specifically a first link 72, a second link 74, a third link 76, and a fourth link 78. The first link 72 is rotatably mounted to the bracket 22 adjacent a first end 80 of the first link 72. Specifically, the first link 72 is rotatably mounted to the side rails 68, 70 adjacent the first end 80. The first end 80 is a rearward-most end of the first link 72. The first link 72 is rotatably connected to the side rails 68, 70 such that the side rails 68, 70 permit rotation of the first link 72 about axis 82 while preventing vertical movement of the first link 72. Element 84 represents the connection between a second end of the first link 72 and a first end of the second link 74. At 84, the first link 72 and second link 74 are rotatably connected together about axis 86. Element 88 represents the connection between a second end of the second link 74 and a first end of the third link 76, which are rotatably connected together about axis 90. Element 92 represents the connection between a second end of the third link 76 and a first end of the fourth link 78, which are rotatably connected about axis 94.

The fourth link 78 is configured to slide in direction parallel to the length of the side rails 68, 70. The fourth link 78 is prevented from moving vertically relative to the bracket 22 by the side rails 68, 70. Adjacent a second end 96 of the fourth link 78, the fourth link 78 includes a pin 98 projecting upward from the fourth link 78. The pin 98 is configured to contact the body 18, indirectly in this example, by way of a first lug 100 as the second door 14 moves forwardly to the closed position. In FIG. 7, the second door 14 is not yet in the closed position but is moving toward the closed position. In FIGS. 4 and 5, the second door 14 is in the closed position. As shown, movement of the second door 14 to the closed position causes contact between the pin 98 and the first lug 100, which causes the fourth link 78 to slide in the rearward direction, raising the second link 74 relative to its position in FIG. 7 into contact with a second lug 102. The lower surface of the second lug 102 and the upper surface of the second link 74 are substantially parallel to one another such that a majority of the surface area of the second link 74 contacts the second lug 102.

The first and second lugs 100, 102 may be separate structures attached directly to the body 18, namely the upper rocker sill 30, or may be integral parts of the upper rocker sill 30. The contact between the second lug 102 by the second link 74 adds stability to the bracket 22 and opposes movement of the bracket 22 in response to applied forces, such as forces applied to a side of the vehicle 10 via contact with an exterior of the second door 14. As used in this disclosure, the second link 74 is considered to contact the upper rocker sill 30, albeit indirectly via the second lug 102. The term contact as used in this context is intended to refer to direct or indirect contact such that force transfers between the second link 74 and the upper rocker sill 30.

It should be understood that terms such as "about," "substantially," and "generally" are not intended to be boundaryless terms, and should be interpreted consistent with the way one skilled in the art would interpret those terms. It should also be understood that directional terms such as "forward," "rearward," "front," "rear," "side," "inner," "outer," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A motor vehicle, comprising:
a body;
a door configured to slide relative to the body between an open position and a closed position;
a bracket connected to the door, wherein the bracket includes a slot;
a locking arm mounted to the body, wherein, when the door is in the closed position, the locking arm is configured to move such that the locking arm is received in the slot; and
a linkage assembly including a plurality of links mounted to the bracket, wherein, when the door is in the closed position, the linkage assembly is configured such that at least one of the plurality of links contacts the body.

2. The motor vehicle as recited in claim 1, wherein:
the body includes a rocker panel adjacent a bottom of a door opening,
the rocker panel includes an upper portion and a lower portion having an elongate opening between the upper portion and the lower portion,
the locking arm is mounted to the lower portion of the rocker panel, and
when the door is in the closed position, the linkage assembly is configured such that at least one of the plurality of links contacts the upper portion.

3. The motor vehicle as recited in claim 2, wherein the bracket projects through the elongate opening.

4. The motor vehicle as recited in claim 1, wherein, as the door moves to the closed position, one of the plurality of links is configured to slide along the bracket to raise another of the plurality of links into contact with the body.

5. The motor vehicle as recited in claim 4, wherein:
the plurality of links includes at least one link configured to move vertically as another of the plurality of links slides without moving vertically.

6. The motor vehicle as recited in claim 5, wherein:
the plurality of links includes a first link, a second link, a third link, and a fourth link,
a first end of the first link is rotatably mounted to the bracket,
a second end of the first link is rotatably mounted to a first end the second link,
a second end of the second link is rotatably mounted to a first end of the third link,
a second end of the third link is rotatably mounted to a first end of the fourth link,
the fourth link includes a pin adjacent a second end of the fourth link, and
the pin is configured such that as the door moves to the closed position, the pin contacts the body so as to cause the fourth link to slide relative to the bracket and to raise the second link into contact with the body.

7. The motor vehicle as recited in claim 1, wherein the locking arm is moveable by an actuator.

8. The motor vehicle as recited in claim 7, wherein:
the actuator includes a pinion and a rack, and
movement of the rack is configured to rotate the locking arm.

9. The motor vehicle as recited in claim 7, wherein:
the locking arm includes a shaft and a head having a greater dimension than the shaft, and
when the door is in the closed position, the locking arm is configured to move such that the shaft of the locking arm is received in the slot and the head is on an opposite side of the bracket as the actuator.

10. The motor vehicle as recited in claim 9, wherein the head includes a flat surface on an opposite side of the head as the slot.

11. The motor vehicle as recited in claim 1, wherein:
the door is a rear door on a first side of the motor vehicle,
the motor vehicle includes a front door on the first side,
the front and rear doors are configured to open and close relative to front and rear portions of a door opening, and
the door opening is not separated by a vertical support of the motor vehicle.

12. A motor vehicle, comprising:
a body;
a door configured to slide relative to the body between an open position and a closed position;
a bracket connected to the door, wherein the bracket includes a slot; and
a locking arm mounted to the body, wherein, when the door is in the closed position, the locking arm is configured to move such that the locking arm is received in the slot,
wherein the bracket includes rollers configured to permit the door to slide relative to the body.

13. A method, comprising:
rotating a locking arm into a slot of a bracket, wherein the locking arm is mounted to a body of a motor vehicle, and the bracket is connected to a door configured to slide relative to the body between an open position and a closed position; and
moving a link of a linkage assembly into contact with the body, where the linkage assembly is mounted to the bracket.

14. The method as recited in claim 13, wherein the moving step includes sliding one of the links of the linkage assembly to cause another of the links of the linkage assembly to raise into contact with the body.

15. The method as recited in claim 14, wherein:
the locking arm is mounted to a lower rocker sill, and
the moving step includes moving the link into contact with an upper rocker sill.

16. The method as recited in claim 15, wherein the bracket projects through an elongate opening between the upper and lower rocker sills.

17. The method as recited in claim 13, wherein the locking arm is moveable by an actuator.

18. The method as recited in claim 17, wherein:
the locking arm includes a shaft and a head having a greater dimension than the shaft, and the rotating step includes rotating the locking arm such that the shaft of the locking arm is received in the slot and the head is on an opposite side of the bracket as the actuator.

* * * * *